United States Patent [19]

Hutson et al.

[11] Patent Number: 4,578,948
[45] Date of Patent: Apr. 1, 1986

[54] REVERSIBLE FLOW VANE PUMP WITH IMPROVED PORTING

[75] Inventors: Allan I. Hutson; Dale L. Hunsberger, both of Rockford, Ill.

[73] Assignee: Sundstrand Corporation, Rockford, Ill.

[21] Appl. No.: 667,276

[22] Filed: Nov. 1, 1984

[51] Int. Cl.⁴ .................. F16D 39/00; F04B 49/00; F04C 15/02
[52] U.S. Cl. ...................... 60/487; 417/204; 417/220; 417/315; 418/30; 418/32
[58] Field of Search .............. 417/204, 217, 220, 315; 418/30-32, 225; 60/487

[56] References Cited

U.S. PATENT DOCUMENTS

| | | | |
|---|---|---|---|
| 2,141,170 | 12/1938 | Centervall | 418/31 |
| 2,485,240 | 10/1949 | Jackson | 418/30 |
| 2,628,567 | 2/1953 | Lancey et al. | |
| 3,185,241 | 5/1965 | Jackson | 180/53 |
| 3,207,078 | 9/1965 | Cook | |
| 3,373,693 | 3/1968 | McKittrick | |
| 3,402,891 | 9/1968 | Clark et al. | 418/31 |
| 3,415,058 | 12/1968 | Underwood et al. | 60/53 |
| 3,642,388 | 2/1972 | Maistrelli | 418/30 |
| 3,664,776 | 5/1972 | Mills et al. | 418/30 |
| 3,734,654 | 5/1973 | Burenga | 418/152 |
| 4,342,545 | 8/1982 | Schuster | 418/30 |
| 4,413,960 | 11/1983 | Specht | 418/19 |

Primary Examiner—John J. Vrablik
Attorney, Agent, or Firm—Wood, Dalton, Phillips, Mason & Rowe

[57] ABSTRACT

A reversible flow vane pump having a pump case with a pump chamber in which a rotor is mounted. The rotor has outwardly-opening slots which carry vanes which engage a cam ring and with fluid chambers between vanes. The cam ring can be adjusted to positions at either side of a neutral position to provide reversible flow operation between a pair of ports, with variable volume control. The ports are arranged to increase the length of time in which a port communicates with an intervane fluid chamber which is of decreasing volume for increased utilization of fluid being pressurized. A port which functions as an inlet port in a predominant mode of operation of the pump has an extension effective to increase the length of time in which an intervane fluid chamber of increasing volume can be filled with fluid. This port extension is blocked from communication with the intervane fluid chambers by the cam ring when the pump is operating other than in the predominant mode of operation in order to prevent communication between the ports.

19 Claims, 6 Drawing Figures

REVERSIBLE FLOW VANE PUMP WITH IMPROVED PORTING

DESCRIPTION 1. Technical Field

This invention pertains to a reversible flow vane pump having improved porting for greater pump efficiency. This is accomplished, in part, by rotationally offset porting to increase the length of time a port communicates with a vane pump chamber which is of decreasing volume and which is most effective in raising pump pressure. This is also achieved by increasing the length of time in which a vane pump chamber of increasing volume communicates with an inlet port to maximize filling of the pump chamber and without cross-communication between the inlet and outlet ports of the pump.

2. Background Art

A common type of positive displacement pump is a vane pump wherein a rotor within a pump chamber carries a series of vanes, in the form of either rollers or blades, which, with conventional pump structure, define intervane fluid chambers therebetween. A contoured surface controls the radial extension of the vanes relative to the rotor to cause intervane fluid chambers to increase in volume while filling from an inlet port and thereafter decrease in volume when discharging to an outlet port. If the vane pump is of variable volume, a movable cam ring can be shifted to various positions of eccentricity relative to the rotor to control the extent of radial movement of the vanes and, therefore, the variation in the size of the fluid chambers between vanes as they travel between the inlet and outlet ports. Further, it is known to have the cam ring positionable to various positions at either side of a neutral position concentric with the rotor, whereby a pair of generally diametrically opposite ports can function alternatively as inlet and outlet ports. This is a bi-directional vane pump.

It is conventional in a reversible flow vane pump to have symmetrical porting, with the inlet and outlet ports diametrically opposite each other, whereby there is the same efficiency of operation in any position of the cam ring at either side of the neutral position.

There are many uses for a vane pump having reversible flow operation wherein the predominant mode of operation is with flow in one direction and it is desirable to modify the porting for improved efficiency in the predominant mode of operation. An example of such a use of a bi-directional pump is shown and described in a pending patent application of Allan Hutson, Ser. No. 595,167, filed Mar. 30, 1984, owned by the assignee of this application. In the Hutson application, a bi-directional roller vane pump is in a closed circuit with a fluid motor to provide a hydrostatic transmission usable for driving a vehicle, such as a tractor. In use of the disclosed reversible flow roller vane pump in such a hydrostatic transmission, there are a pair of pump ports, each of which is connected by a fluid line to a port of the fluid motor whereby the pump ports function one as an inlet port and one as an outlet pressure port and with the roller vane pump being bi-directional in operation the function of the ports can be reversed to achieve a reversal in the operation of the fluid motor. The tractor predominantly operates in a forward direction of travel and, thus, the vane pump predominantly operates in what may be called a "forward direction" to provide a hydrostatic transmission output which will drive the vehicle in the forward direction. The invention pertains to unique porting effective in the predominant forward direction of pump operation to improve the efficiency of a reversible flow pump when so operating.

DISCLOSURE OF THE INVENTION

A primary feature of the invention is to provide a reversible flow vane pump having porting arranged to provide improved efficiency in a predominant direction of operation.

Another feature of the invention is to provide a reversible flow vane pump having rotationally offset porting to increase the length of time in which a port functioning as an outlet port communicates with an intervane fluid chamber of decreasing volume to maximize the delivery of pressurized fluid to the outlet port.

Another feature of the invention is to provide a reversible flow vane pump with means for increasing the length of one of the ports of the pump when functioning as an inlet port when the pump is operating in the predominant forward direction to achieve increased filling capability for an intervane fluid chamber. When the pump is operating in the other direction of operation, the port is of a lesser length to prevent communication between the pump ports.

An object of the invention is to provide a reversible flow vane pump comprising, a rotor rotatable about an axis, a plurality of vanes carried by said rotor and movable radially of said rotor axis, a cam ring surrounding and spaced from said rotor to control the radial movement of said vanes, first and second ports at opposite sides of said rotor axis, means mounting said cam ring for pivotal movement about an axis parallel to and offset from said rotor axis to enable the cam ring to have a neutral position or positions at either side of said neutral position with positions at one side of neutral providing for pump flow from the first port to the second port and the positions at the other side of neutral providing for reverse pump flow from the second port to the first port, and said ports being constructed and arranged to achieve greater pumping efficiency when the pump flow is from the first port to the second port.

Still another object of the invention is to provide a reversible flow vane pump as defined in the preceding paragraph wherein the first port has an effectively variable length, dependent upon the orientation of the cam ring away from said neutral position.

Still another object of the invention is to provide a reversible flow vane pump as defined in the preceding paragraphs wherein said first port has a radially offset extension to increase the effective length thereof and said cam ring covers said radially offset extension when in neutral position and when in positions to cause pump flow from the second port to the first port.

Still another object of the invention is to provide a reversible flow vane pump wherein said second port has an arcuate length and the mid-point of said arcuate length is offset in the direction of rotor rotation from a line extending between the rotor axis and a pivot axis for the cam ring to extend the communication of the second port with the decreasing volume of an intervane fluid chamber.

Still another object of the invention is to provide a reversible flow vane pump comprising, a rotor rotatable about an axis, a plurality of vanes carried by said rotor and movable radially of said rotor axis, means for controlling the radial movement of said vanes, first and second ports at opposite sides of said rotor axis, means providing for either forward pump flow from the first port to the second port or reverse pump flow from the second port to the first port by controlling the volume of the space between vanes, and said ports being constructed and arranged to achieve greater pumping efficiency when the pump flow is from the first port to the second port by offsetting said second port to obtain maximum communication with a decreasing space between vanes in forward flow operation and having the first port of variable length with the longer length operable in forward flow operation.

BEST MODE FOR CARRYING OUT THE INVENTION

Figure 1:
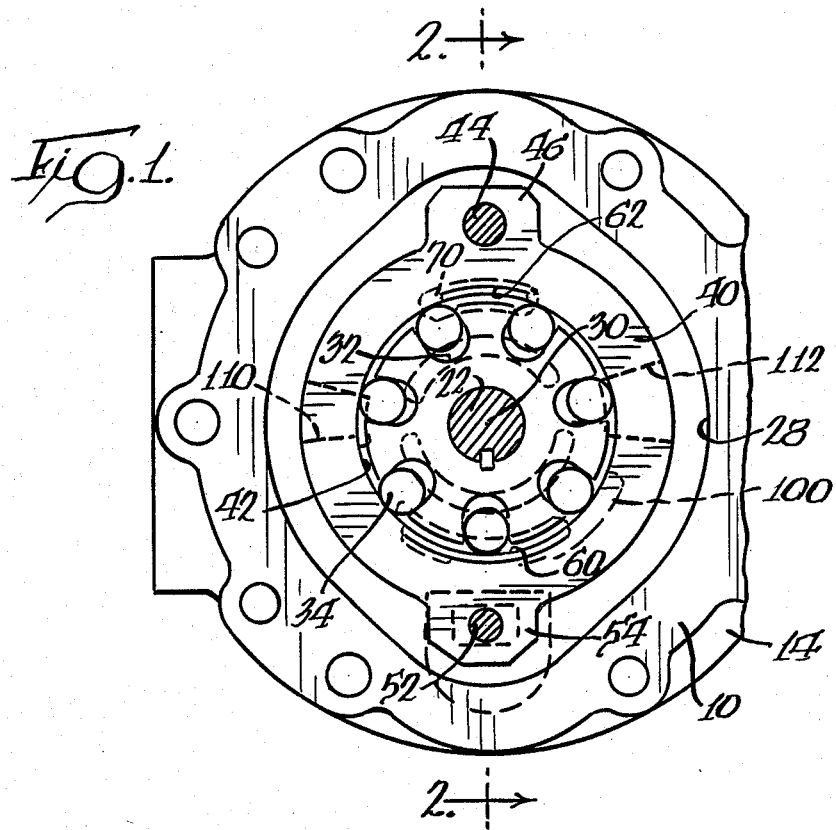
FIG. 1 is a fragmentary sectional view of a reversible flow roller vane pump, with the section being taken generally along the line 1—1 in FIG. 2.
Figure 2:
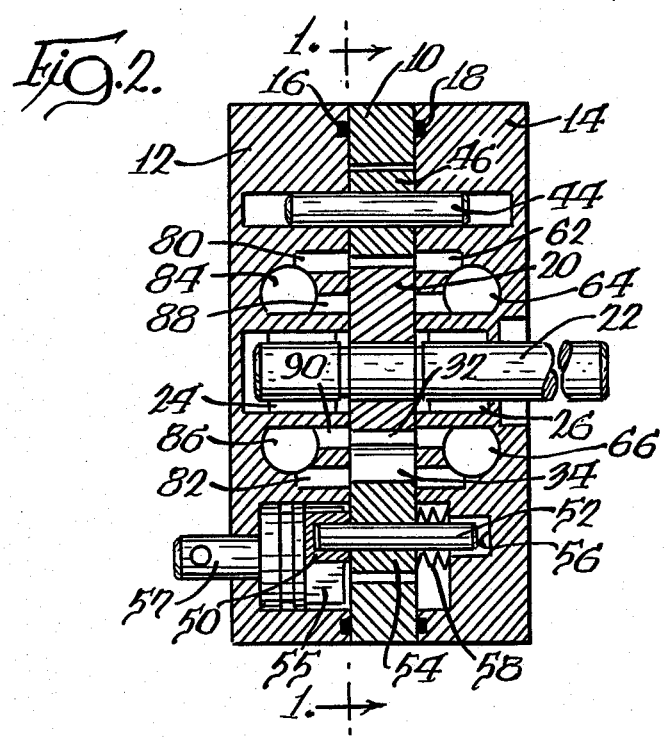
FIG. 2 is a transverse section of the reversible flow roller vane pump, taken generally along the line 2—2 in FIG. 1.

The general construction of the reversible flow roller vane pump 8 is shown in FIGS. 1 and 2. The pump case has a center section 10 and a pair of side walls 12 and 14 positioned at opposite sides thereof and in sealing relation therewith by circumferential grooves 16 and 18 which may communicate with a case drain or have O-rings mounted therein.

The center section 10 is generally annular to provide, with the side walls 12 and 14, a pump chamber which houses a rotor 20 which is mounted fixedly to a driven shaft 22 rotatably supported by bearings 24 and 26 in the pump case side walls 12 and 14, respectively, and which defines an axis of rotation 30.

The pump case center section 10 has an internal surface at 28 which defines the outer periphery of the pump chamber.

Figure 3:
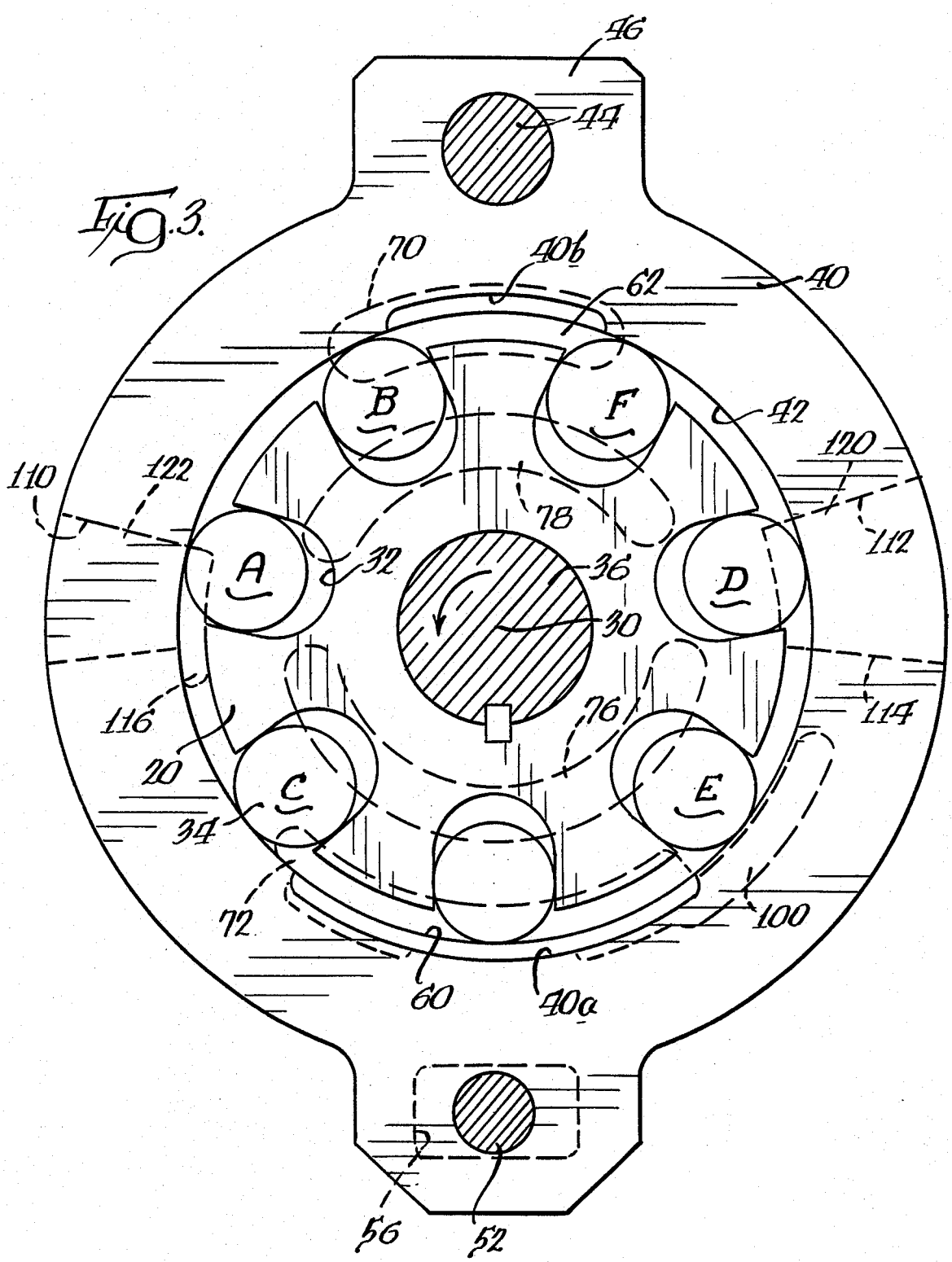
FIG. 3 is a diagrammatic view of operative components of the pump, shown in neutral position and on an enlarged scale.
Figure 4:
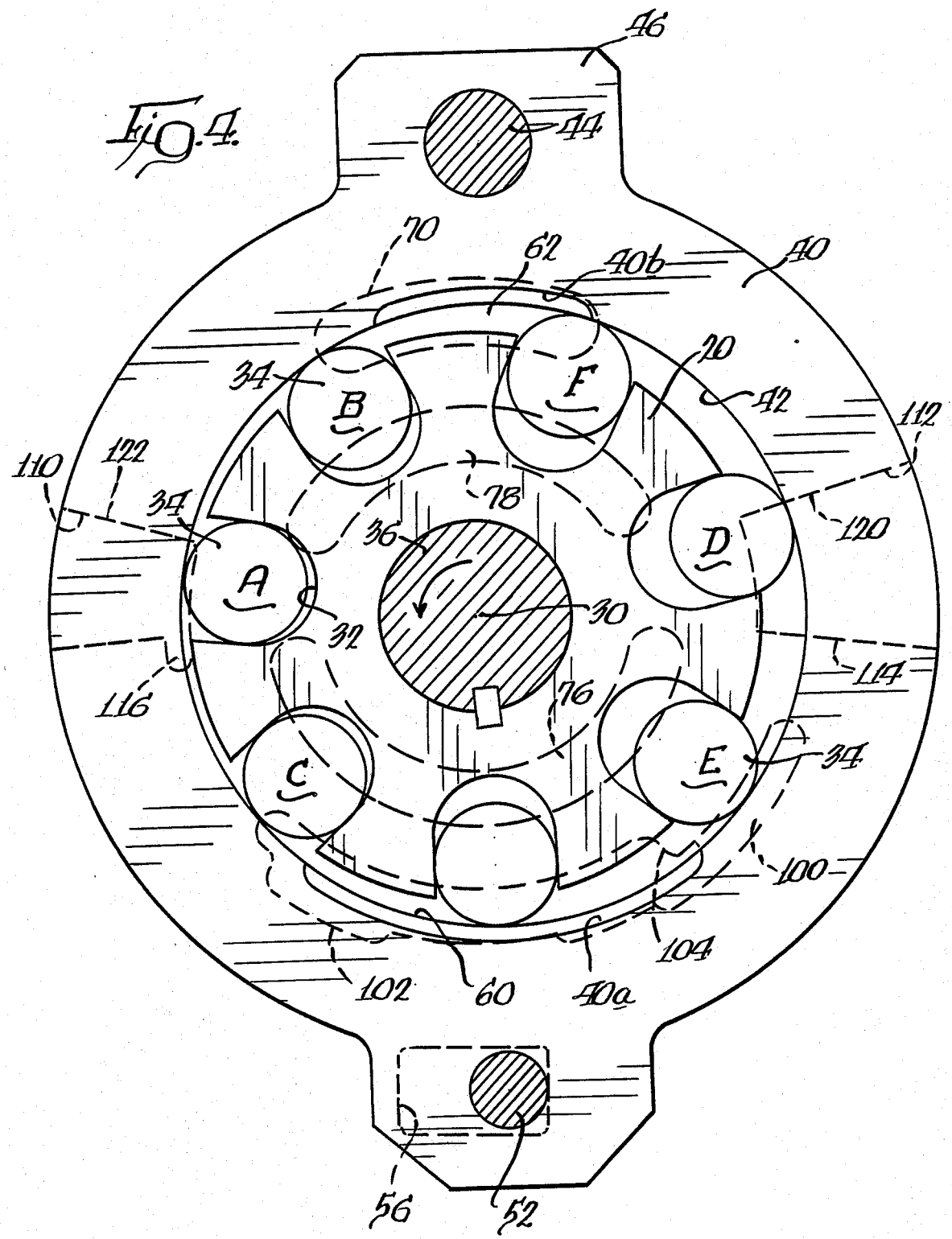
FIG. 4 is a view similar to FIG. 3, showing the pump components positioned to achieve flow between the pump ports in a "forward direction" of operation.
Figure 5:
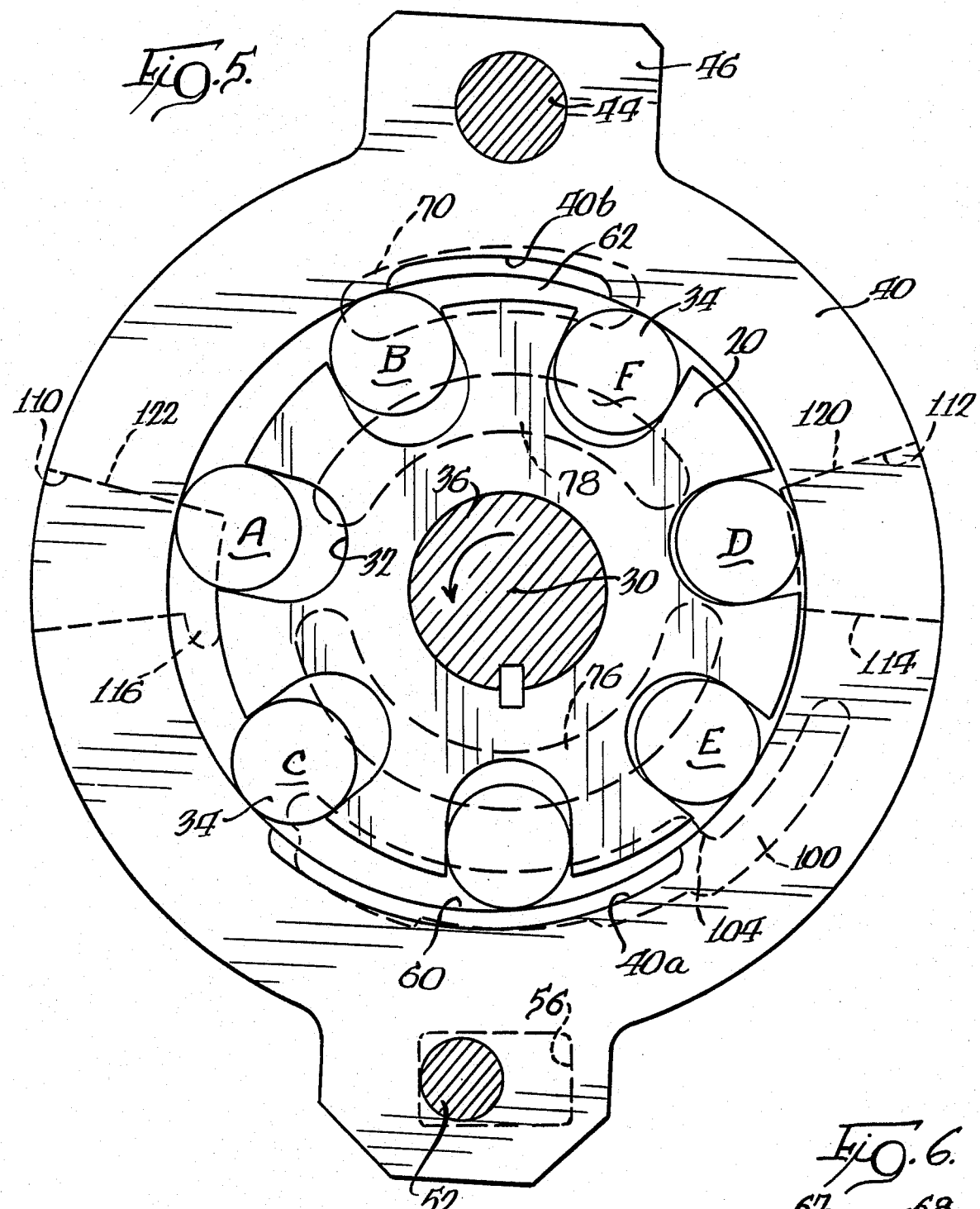
FIG. 5 is a view similar to FIG. 3 showing the components positioned to achieve a "reverse direction" of operation.

The rotor 20 has a plurality of circumferentially equally-spaced, outwardly-opening slots 32, each of which movably mounts a roller van 34, with the movement of the roller vanes 34 outwardly of the slots 32 being controlled by the position of a cam ring 40. The cam ring 40 is an annular member having an inner peripheral circular surface 42, defining a cam surface engageable by the roller vanes 34. The cam ring 40 has a neutral position, seen in FIGS. 1 and 3, and has positions to either side of neutral, as illustrated in FIGS. 4 and 5. The vanes can be defined by means other than rollers, such as blades, in order to provide swept volumes of fluid at the periphery of the rotor.

The cam ring 40 is mounted for pivotal movement on a pin 44 extending through an ear 46 on the cam ring and fitted on openings in the pump case side walls 12 and 14. The position of the cam ring 40 is set by the positioning of a block 50 mounted within a slot 55 in the control shaft 57 which is housed in the pump case side wall 12 for transverse movement, as viewed in FIG. 1, and which has a pin 52 secured thereto which extends through an ear 54 at the lower end of the cam ring, as viewed in FIGS. 1 and 2. A slot 56 is provided in pump case side wall 14 to prevent overstroking of the cam ring 40 by limiting the travel of pin 52. A plurality of Belleville springs 58 surround the pin 52 to take up tolerances and prevent rattling of the actuation structure.

The structure is more particularly disclosed and described in the Hutson application, previously referred to, and reference may be made thereto for a more detailed understanding of this structure. With the cam ring 40 concentric with the axis of rotation 30, the cam ring is in the neutral position shown in FIG. 3, wherein the pin 52 is centered relative to the slot 56. In FIG. 4, pin 52 is shown at the right-hand end of the slot 56 to position the cam ring 40 to achieve flow in a "forward direction" between the pump ports to be described. In FIG. 5, the pin 52 is positioned at the left-hand end of the slot 56 to achieve a reversal in the direction of flow from that achieved with the pump components as positioned in FIG. 4 and which will be subsequently described as "reverse direction" operation.

The pump 8 has a plurality of intervane fluid chambers with a fluid chamber defined between a pair of adjacent roller vanes 34, the cam surface 42 of the cam ring 40, the exterior surface of the rotor 20 between the roller vanes and the interior surfaces of the pump case side walls 12 and 14. Each of these fluid chambers transports a swept volume of fluid between an inlet port and an outlet port. Additionally, there are undervane pumping chambers defined between the base of the outwardly-opening slots 32 which carry the roller vanes 34 and the under surface of the roller vanes.

Figure 6:
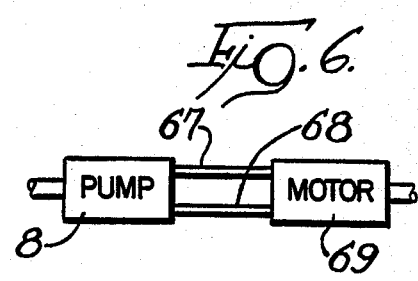
FIG. 6 is a diagrammatic view of a pump and motor connected in a closed fluid circuit as in a hydrostatic transmission.

The porting is provided in each of the pump case side walls 12 and 14 and the porting in one pump case side wall is the mirror image of the other. The porting for the pump case side wall 14 is shown particularly in FIGS. 3 to 5. There are a pair of outer arcuate ports generally diametrically opposite each other, including a first port 60 and a second port 62, with these ports communicating with passageways 64 and 66, respectively, which, by suitable connections 67 and 68 can be connected to a source of fluid and a pressure utilization device which, in a use such as shown in the Hutson application previously referred to, would be the outlet and inlet ports, respectively, of a fluid motor 69 (FIG. 6). The ports 60 and 62 at the face of the pump case side wall 14 are of increased dimension, as indicated by the respective broken lines 70 and 72. The passageways 64 and 66 also communicate, respectively, with a pair of inner arcuate ports, with an inner arcuate port 76 communicating with the undervane pumping chambers defined by the rotor slots 32 beneath a plurality of roller vanes 34 and the inner arcuate port 78 communicating with a number of undervane pumping chambers which are adjacent the second port 62. The cam ring 40 has side grooves 40a and 40b which coact with the ports 60, 62, 80 and 82 to facilitate fluid flow.

As seen in FIG. 2, pump case side wall 12 has the same porting, with outer arcuate ports 80 and 82 corresponding to second and first ports 62 and 60 communicating with the connecting passages 84 and 86 associated with the respective connecting passages 64 and 66. Inner arcuate ports 88 and 90 connect to the connecting passages 84 and 86, respectively, and operate similarly to the inner arcuate ports 76 and 78 to communicate with the undervane pumping chambers.

The pump structure thus far described, except for porting details to be described, is generally known in the art wherein rotation of the driven shaft 22 causes rotation of the rotor 20 to successively carry roller vanes 34 past the first port 60 and the second port 62 communicating with the pump chambers between roller vanes and also to carry the undervane pumping chambers between the ports 76 and 78.

The pump is disclosed as a reversible flow, variable volume structure dependent upon the position of the cam ring 40. As seen in the neutral position of FIG. 3, the fluid chambers between roller vanes as well as the undervane pumping chambers do not change their swept volume, so that there is no pump flow.

In the operating mode shown in FIG. 4, which is referred to as "forward direction" operation, the cam ring 40 has been pivoted about the pin 44 to cause a variation in the volume of the intervane pump chambers, as well as the undervane pump chambers as the rotor rotates and there is "forward" pump flow from the first ports 60 and 82 to the second ports 62 and 80 and from the inner arcuate ports 76 and 90 to the inner arcuate ports 78 and 88. In the operating mode illustrated in FIG. 5, which is referred to as "reverse direction" operation, the cam ring 40 has been pivoted in a clockwise direction about the pin 44 whereby there is "reverse" pump flow from the second ports 62 and 80 to the first ports 60 and 82 and from the inner arcuate ports 78 and 88 to the inner arcuate ports 76 and 90.

With the foregoing general description of a pump having swept volumes at the perimeter of the rotor and, more particularly, a vane pump having reversible variable volume flow, the improvements may be more particularly described. With the cam ring 40 positioned at either side of the neutral position, shown in FIG. 3 and as illustrated in FIGS. 4 and 5, the cam ring is out of concentricity with the rotor 20 and a pair of cross-overs are defined.

At a first cross-over, a fluid chamber between a pair of vanes changes from a fluid chamber of decreasing volume to one of increasing volume, while at the second cross-over, the fluid chamber changes from one of increasing volume to one of decreasing volume. These cross-overs are defined at locations wherein the cam surface 42 of the cam ring is at minimum and maximum distances from the surface of the rotor 20, respectively. The first cross-over, in FIG. 4, lies slightly above a transverse line passing through the axis of rotation 30 and to the left thereof. The second cross-over, wherein the distance between the rotor and the cam ring is maximum, lies below a transverse line through the axis of rotation 30 of the rotor and to the right thereof. Referring to FIG. 5, the first cross-over lies to the right of the axis of rotation 30 and slightly above a transverse line therethrough. The second cross-over lies to the left of the axis of rotation 30 and slightly below a transverse line therethrough.

In the forward operation illustrated in FIG. 4, the maximum pumping efficiency is achieved by increasing the communication time of the pump outlet port, the second port 62, with a pump chamber of decreasing volume which is pressurizing the fluid and by increasing the length of time in which a fluid chamber of increasing volume is in communication with the inlet port, the first port 60. The increased time of communication with the outlet port is achieved by rotationally offsetting the parts of the second ports 62 and 80 which open to the intervane fluid chambers between the roller vanes and as illustrated by broken line 70 in FIG. 4. A line passing through the center of the cam ring mounting pin 44 and the axis of rotation 30 passes through top dead center of the pump and, as seen in FIG. 3. The second port 62 is generally symmetrical with this line but the opening 70 thereof is rotationally offset in a counterclockwise direction whereby there is increased communication time with a fluid chamber between roller vanes 34, identified at A and B. In FIG. 4, the roller vane B has just reached a position to block off communication with the trailing edge of the port opening 70 with the rotor 20 rotating in the direction of the arrow shown in FIG. 4. This permits the utilization of additional pressurized fluid which is in a decreasing swept volume between roller vanes and which is approaching the minimum distance cross-over. The inner arcuate ports 76,84 and 78,86 are rotationally offset similarly to the outer arcuate ports 60,80 and 62,82, respectively.

The increased fill time for a fluid chamber of increasing volume is achieved by varying the effective length of the first port 60 only when in the forward direction operation, illustrated by positioning of the components as shown in FIG. 4. This increased effective length is achieved by the use of a radially offset arcuate extension 100 of the first port 60 which extends from the first port in the direction of rotor rotation and is at a greater radial distance from the rotor axis 30 than the first port 60. The selective variation of the length of the first port 60 is illustrated by comparison of FIGS. 3, 4 and 5. When the cam ring 40 is in neutral position, the radially inward edge of the extension 100 is blocked from communication with the fluid chambers between vanes by the cam ring 40. There is also blockage of the extension 100 when the cam ring 40 is positioned for reverse direction operation, as shown in FIG. 5. The extension 100 only communicates with intervane fluid chambers when in the forward direction operation for maximum pumping volume, as illustrated in FIG. 4, or when the cam ring 40 is positioned to a lesser pivoted position but still for forward direction operation. The normal length of the first port 60 as exposed to the fluid chambers is shown by the broken line 102 and with the extension 100 extending beyond an end 104 thereof. This increases the time of communication of a fluid chamber with the first port 60 when the latter port is functioning as an inlet port for maximum filling of a fluid chamber as it approaches the maximum cross-over and is of increasing volume.

In the reverse direction operation of FIG. 5, the second port 62 is the inlet port and it supplies fluid chambers of increasing volume and, as a fluid chamber travels past the maximum cross-over, the fluid is pressurized and delivered to the first port 60 which is the outlet port. The first port 60 terminates at the trailing edge 104, since the extension 100 thereof is blocked by the cam ring 40.

The extension 100 is radially offset to be utilized only in the forward operation illustrated in FIG. 4 in order to be blocked by the cam ring 40 when the pump is in neutral or in the reverse direction operation illustrated in FIG. 5. When in reverse direction operation, the first port 60 is the pressure outlet port and, if the extension 100 communicated with an intervane fluid chamber between vanes, there could be communication at the minimum cross-over, seen in FIG. 5, between the first port 60 and second port 62 whereby pressure would not be maintained at the first port 60. The radial positioning of the extension 100 relative to the positioning of the cam ring 40 is selected whereby when the pump operation is shifted from forward direction to reverse direction, the cam ring 40 will block the extension 100 from communication with an intervane fluid chamber slightly before the cam ring 40 reaches the neutral position of FIG. 3 to avoid cross-communication between the first port 60 and the second port 62.

In the use of the pump, as in the previously described hydrostatic transmission for a vehicle, the predominant time of operation is in the described forward direction. Therefore, the extension 100 can be associated with the first port 60 and rendered effective by positioning of the cam ring 40 when in forward direction operation and removed from the system by positioning of the cam ring 40 when in reverse direction operation.

The pump also has means to prevent cavitation and to prevent blow-by resulting from a trapped swept volume under compression causing movement of a vane away from the cam surface of the cam ring and resulting noise by rattling contact between vanes and the cam ring.

This means embodies the use of a pair of auxiliary ports 110 and 112 located generally one at each of the cross-overs of the pump. These auxiliary ports 110 and 112 each have an arcuate length sufficient to be effective in preventing blow-by and cavitation and are effective in many types of pump including the bi-directional pump disclosed herein.

In the forward direction operation of FIG. 4, the auxiliary port 110 is located in the area of minimum cross-over and there is an intervane fluid chamber between roller vanes A and B of decreasing volume and which is out of communication with the second port 62 which is the pressure port. This results in a trapped volume of fluid in a decreasing volume intervane fluid chamber which, without the auxiliary port 110, could result in a pressure build-up sufficient to force the roller vane A away from the cam surface 42 of the cam ring, with resulting loss of pressure because of blow-by of pressure to the inlet port 60. The blow-by also results in a rattle caused by movement of the roller vane A toward and away from the surface of the cam ring which is a common source of noise in a vane pump. The auxiliary port 110 is connected to a source of fluid at ambient pressure, such as case pressure within the pump chamber externally of the cam ring 40 whereby fluid between roller vanes A and B can flow to the pump chamber and blow-by is prevented.

The spacing between the trailing edge of the second port opening 70 and the leading edge of the auxiliary port 110 is slightly less than the distance between the lines of contact of two adjacent roller vanes with the cam surface 42 of the cam ring whereby the fluid chamber between the vanes A and B will communicate with the auxiliary port 110 slightly before vane B closes off communication with the second port 62. This is only a temporary transient condition with some slight loss of pressure by flow through the auxiliary port 110. However, this slight loss is offset by the avoidance of blow-by and creation of noise. As seen in FIG. 4, communication with the second port 62 is blocked; however, roller vane A is in a position to have placed the trailing fluid chamber already in communication with the auxiliary port 110.

During the forward direction operation shown in FIG. 4, the auxiliary port 112 has a leading edge 114 rotationally in advance of the maximum cross-over whereby the connection thereof to the source of fluid at ambient pressure enables filling of an expanding intervane fluid chamber to prevent cavitation which would otherwise result from a lack of fluid to fill the fluid chamber, since roller vane E has blocked off communication with the first port 60.

The auxiliary port 110 has a finger 116 extending beyond the trailing edge thereof which enables supply of fluid at case pressure to an expanding fluid chamber between roller vanes A and C prior to the time at which that fluid chamber reaches communication with the first port 60. Thus, the auxiliary ports avoid cavitation problems throughout the extent of rotor rotation by providing a source of fluid to expanding intervane fluid chambers in the forward direction of operation.

In the reverse direction operation as illustrated in FIG. 5, the auxiliary port 112 prevents blow-by and rattling noise by having the leading edge 114 thereof rotationally in advance of the minimum cross-over position. A fluid chamber between roller vanes D and E, which is of decreasing volume, may communicate with the auxiliary port 112 to prevent a pressure build-up in a trapped volume and thus avoid blow-by and the erratic movement of the roller vane D.

The roller vanes D and E, as positioned in FIG. 5, have moved past the locations at which the fluid chamber therebetween first communicates with the auxiliary port 112 and is out of communication with the first port 60. The extension 100 of the first port 60 is not effective to prevent blow-by since the cam ring 40 is positioned to block the extension 100 from communication with the fluid chamber between vanes. The blocking of the extension 100 is necessary to assure that pressure at the first port 60 cannot communicate with the ambient pressure at the auxiliary port 112. The auxiliary port 112 has its trailing edge 120 located beyond the minimum cross-over whereby fluid at ambient pressure can reach a fluid chamber between the roller vanes D and F which is of increasing volume to prevent cavitation.

In the reverse direction operation of FIG. 5, the auxiliary port 110 assists to prevent cavitation by having a leading edge 122 thereof located in advance of the maximum cross-over, whereby a fluid chamber between roller vanes A and B which is of increasing volume can be supplied with fluid from the auxiliary port 110 after passing out of communication with the second port 62 which is the inlet port.

As stated previously, the embodiment of the inventions in a reversible flow roller vane pump is for illustrative purposes only, with it being understood that the invention with respect to the improved porting efficiency could be used with other types of vane pumps and the improvements relating to prevention of cavitation and blow-by could be utilized with any type of pump having swept volumes carried around the periphery of a rotor and without structure for achieving reversible variable volume flow.

We claim:

1. A reversible flow vane pump comprising, a rotor rotatable about an axis, a plurality of vanes carried by said rotor and movable radially of said rotor axis, means for controlling the radial movement of said vanes, first and second ports at opposite sides of said rotor axis, means providing for either forward pump flow from the first port to the second port or reverse pump flow from the second port to the first port by controlling the volume of the space between vanes, and said ports being constructed and arranged to achieve greater pumping efficiency when the pump flow is from the first port to the second port by offsetting said second port to obtain maximum communication with a decreasing space between vanes in forward flow operation and having means to make the first port of variable length with the longer length operable in forward flow operation.

2. A reversible flow vane pump comprising, a case having a pump chamber with a pair of opposed walls, a rotor rotatably mounted in said pump chamber and having a plurality of circumferentially-spaced outwardly-opening slots at the periphery thereof, a plurality of vanes movably mounted one in each of said outwardly-opening slots, a cam ring positioned within said pump chamber and surrounding said rotor, said cam ring having a neutral position concentric with said rotor and positions to either side of said neutral position wherein the cam ring is eccentric relative to the rotor to define a plurality of variable volume fluid chambers between said side walls, the rotor, the cam ring and successive pairs of vanes, said cam ring when positioned other than in said neutral position defining first and second diametrically opposite cross-overs, said fluid chambers increasing in volume as the rotor successively moves said vanes from said first to said second cross-over and decreasing in volume as the rotor successively moves said vanes from the second to the first cross-over, arcuate ports in said side walls opening to a plurality of said fluid chambers, the improvement comprising one of said arcuate ports having an offset portion and means for varying the effective length of said one arcuate port dependent on the orientation of the cam ring away from said neutral position which controls communication of said offset portion with the fluid chambers.

3. A reversible flow vane pump as defined in claim 2 in combination with a fluid motor in a closed fluid circuit, said cam ring being movable in one direction from said neutral position to establish a forward direction of operation of said fluid motor and movable in an opposite direction to establish a reverse direction of operation of said fluid motor, and said one outer arcuate port is of increased effective length when the cam ring is positioned to cause the forward direction of operation of the motor.

4. A reversible flow vane pump as defined in claim 1 wherein said one arcuate port has a radially offset extension to increase the effective length thereof when there is pump flow from said one arcuate port to the other arcuate port, and said cam ring covering said radially offset extension when in neutral position and positions to cause pump flow from the other arcuate port to said one arcuate port.

5. A reversible flow vane pump comprising, a rotor rotatable about an axis, a plurality of vanes carried by said rotor and movable radially of said rotor axis, a cam ring surrounding and spaced from said rotor to control the radial movement of said vanes, first and second ports at opposite sides of said rotor axis for communication with fluid chambers between vanes, means mounting said cam ring for pivotal movement about an axis parallel to and offset from said rotor axis to enable the cam ring to have a neutral position or positions at either side of said neutral position with positions at one side of neutral providing for forward pump flow from the first port to the second port at a predetermined rate of flow and the positions at the other side of neutral providing for reverse pump flow from the second port to the first port at a lesser rate of flow, and said ports being rotationally offset from a line extended through the cam pivot axis and the rotor axis to have a major part of the first port extending beyond said line in the direction of rotor rotation for an extended duration of flow from the first port to successive fluid chambers when operating to achieve forward pump flow and a major part of the second port also extending beyond said line in the direction of rotor rotation to extend the duration of flow from successive fluid chambers to the second port when operating to achieve forward pump flow.

6. A reversible flow vane pump as defined in claim 5 including means to reduce the effective length of that part of the first port which extends beyond said line when there is reverse pump flow.

7. A reversible flow vane pump as defined in claim 5 wherein there are two diametrically opposite cross-overs when said cam ring is in a position other than the neutral position with there being a minimum distance between the rotor and cam ring at one cross-over and a maximum distance therebetween at the other cross-over, and said first port having a radially outwardly offset extension communicating with a fluid chamber immediately prior to the fluid chamber reaching the maximum distance cross-over.

8. A reversible flow vane pump as defined in claim 7 wherein said cam ring blocks said radially offset extension when positioned to change the distance of the last-mentioned cross-over from maximum to minimum.

9. A reversible flow vane pump as defined in claim 5 including thrid and fourth ports arranged generally symmetrically with said first and second ports, respectively, and similarly rotationally offset for communication with the underside of the vanes.

10. A reversible flow vane pump as defined in claim 5 wherein said pump has a case with opposed side walls defining an interior chamber housing said rotor and cam ring and wherein each of said side walls has said first and second ports, and said cam ring has side grooves positioned to coact with said first and second ports in both side walls to facilitate fluid flow between the ports and fluid chambers.

11. A reversible flow vane pump comprising, a rotor rotatable about an axis, a plurality of vanes carried by said rotor and movable radially of said rotor axis, a cam ring surrounding and spaced from said rotor to control the radial movement of said vanes, first and second ports at opposite sides of said rotor axis, means mounting said cam ring for pivotal movement about an axis parallel to and offset from said rotor axis to enable the cam ring to have a neutral position or positions at either side of said neutral position with positions at one side of neutral providing for pump flow from the first port to the second port and the positions at the other side of neutral providing for reverse pump flow from the second port to the first port, and said ports being constructed and arranged to achieve greater pumping efficiency when the pump flow is from the first port to the second port including said first port having a radially offset extension to increase the effective length thereof when there is pump flow from the first port to the second port, and said cam ring covering said radially offset extension when in positions to cause said reverse pump flow.

12. A reversible flow vane pump as defined in claim 11 wherein said radially offset extension is at a greater radial distance from the rotor axis than said first port and has an arcuate length extending from the first port in the direction of rotor rotation.

13. A reversible flow roller vane pump in combination with a fluid motor in a closed fluid circuit comprising, a case having a pump chamber, a rotor rotatably mounted in said pump chamber for unidirectional rotation and having a plurality of circumferentially-spaced outwardly-opening slots at the periphery thereof, a plurality of roller vanes movably mounted on in each of said outwardly-opening slots, a cam ring positioned within said pump chamber and surrounding said rotor, said cam ring having a neutral position concentric with said rotor and positions at either side of said neutral position wherein the cam ring is eccentric relative to the rotor to define a plurality of variable volume fluid chambers between the rotor, the cam ring and successive pairs of roller vanes, circumferentially-spaced first and second arcuate ports opening to two groups of said variable volume fluid chambers, said cam ring being movable in one direction from said neutral position to establish a forward direction of operation of said fluid motor with flow from the first arcuate port to the second arcuate port and movable in an opposite direction to establish a reverse direction of operation of said fluid motor with flow from the second arcuate port to the first arcuate port, means for effectively increasing the length of the first arcuate port when the cam ring is positioned to cause the forward direction of operation of the motor, comprising a radially offset extension of the first arcuate port to increase the effective length thereof when there is pump flow from the first arcuate port to the second arcuate port, and said cam ring covers said radially offset extension when in neutral position and positions to cause pump flow from the second arcuate port to the first arcuate port.

14. A combination as defined in claim 13 wherein said radially offset extension is at a greater radial distance from the rotor axis than said first arcuate port and has an arcuate length extending from the first arcuate port in the direction of rotor rotation.

15. A reversible flow roller vane pump comprising, a rotor rotatable about an axis, a plurality of roller vanes carried by said rotor and movable radially of said rotor axis, a cam ring surrounding and spaced from said rotor to control the radial movement of said roller vanes, first and second ports at opposite sides of said rotor axis for communication with fluid chambers between roller vanes, means mounting said cam ring for pivotal movement about an axis parallel to and offset from said rotor axis to enable the cam ring to have a neutral position or positions at either side of said neutral position with positions at one side of neutral providing for pump flow from the first port to the second port and the positions at the other side of neutral providing for reverse pump flow from the second port to the first port, said ports being rotationally offset from a line extended through the cam pivot axis and the rotor axis to have a major part of the first port extending beyond said line in the direction of rotor rotation for an extended duration of flow between the first port and successive fluid chambers, a major part of the second port also extending beyond said line in the direction of rotor rotation to extend the duration of flow between successive fluid chambers and the second port, and means to reduce the effective length of that part of the first port which extends beyond said line when there is reverse pump flow.

16. A reversible flow roller vane pump as defined in claim 15 wherein there are two diametrically opposite cross-overs when said cam ring is in a position other than the neutral position with there being a minimum distance between the rotor and cam ring at one cross-over and a maximum distance therebetween at the other cross-over, and said major part of the first port having a radially offset outwardly extension communicating with a fluid chamber immediately prior to the fluid chamber reaching the maximum distance cross-over when the cam ring is positioned for pump flow from the first port to the second port.

17. A reversible flow roller vane pump as defined in claim 16 wherein said cam ring blocks said radially offset extension when positioned for reverse pump flow.

18. A reversible flow roller vane pump as defined in claim 15 wherein said pump has a case with opposed walls defining a pump chamber housing said rotor and cam ring, each of said side walls has first and second ports, and said cam ring has side grooves positioned to coact with said first and second ports to facilitate fluid flow between the ports and fluid chambers.

19. A reversible flow roller vane pump comprising, a case having a pump chamber with a pair of opposed side walls; a rotor rotatably mounted in said pump chamber and having a plurality of circumferentially-spaced outwardly-opening slots at the periphery thereof; a plurality of roller vanes movably mounted one in each of said outwardly-opening slots; a movable cam ring positioned within said pump chamber and surrounding said rotor, said cam ring having a neutral position concentric with said rotor and shiftable to positions at either side of the neutral position wherein the cam ring is eccentric relative to the rotor to define a plurality of variable volume intervane fluid chambers between said side walls, the rotor, cam ring and successive pairs of roller vanes; said cam ring when positioned other than in said neutral position defining first and second diametrically opposite cross-overs; said intervane fluid chambers increasing in volume as the rotor moves roller vanes from said first to said second cross-over and decreasing in volume as the rotor moves roller vanes from the second to the first cross-over; inner and outer arcuate ports in said side walls with the outer arcuate ports positioned to communicate with successive intervane fluid chambers during rotor rotation and the inner arcuate ports positioned to communicate with successive slots in the rotor inwardly of the roller vanes; said inner and outer arcuate slots being rotationally offset from a plane transverse to the direction of shifting movement of the cam ring and in the direction of rotor rotation; one of said outer arcuate ports having a radially outward offset extension; and said cam ring blocking said offset extension when in neutral position or positions at one side thereof and unblocking said offset extension when in positions at the other side of neutral.

* * * * *